United States Patent Office 3,595,962
Patented July 27, 1971

3,595,962
METHOD OF USING 4-ARYLBICYCLO[2.2.2]OCTYL URETHANS AS ANTIDEPRESSANTS AND COMPOSITIONS THEREOF
Paul E. Aldrich, Wilmington, Del., assignor to E. I. du Pont de Nemours and Company, Wilmington, Del.
No Drawing. Continuation-in-part of application Ser. No. 697,302, Jan. 12, 1968. This application Feb. 6, 1970, Ser. No. 9,395
Int. Cl. A61k 27/00
U.S. Cl. 424—274      6 Claims

ABSTRACT OF THE DISCLOSURE

This invention teaches the preparation of 4-arylbicyclo [2.2.2]oct-1-yl urethans and methods of using and formulating the same as antidepressant agents.

Representative of the compounds within the scope of this invention are ethyl N-4-phenylbicyclo[2.2.2]oct-2-en-1-yl urethan and propyl N - 4 - (o-tolyl)bicyclo[2.2.2] octane-1-yl urethan.

CROSS REFERENCE TO RELATED APPLICATION

This application is a divisional and continuation-in-part of my copending application Ser. No. 697,302, filed Jan. 12, 1968, now U.S. Pat. 3,507,957.

BACKGROUND OF THE INVENTION

This invention relates to methods of using 4-arylbicyclo[2.2.2]oct-1-yl urethans as pharmaceutical agents. More particularly, this invention relates to said 4-arylbicyclo[2.2.2]oct-1-yl urethans which can be used as antidepressant agents.

Before the late 1950's no adequate pharmaceutical agent was known which could be used for the treatment of depression, and the medical arts had to rely on psychotherapy for treating mild depressions and electroconvulsive therapy to counteract severe depressions.

Then, in the late 1950's, the first truly effective pharmacological agents useful for treating various depressive syndromes were developed. These agents were lumped together as a class known as monamine oxidase (MAO) inhibitors based on their ability to inhibit the metabolic oxidative deamination of naturally occurring amines such as dopamine and tyramine. These MAO inhibitors comprise a heterogeneous group of drugs having in common this ability to inhibit the metabolic oxidative deamination of naturally occurring amines.

A later development in the treatment of depression was the discovery that dibenzazepine derivatives could be used to treat depressive syndromes. These agents are thought of as the successors to the MAO inhibitors and although their mode of action is not well understood, they are effective antidepressants.

The discovery of the above described agents as useful therapeutic agents for treating depressive syndromes has presented psychotherapy with a useful tool that can and has been advantageously used in the management of depression.

There is however, a continuing need for new agents in this field. It is in this field of antidepressive agents that the compounds of this invention are useful and can contribute to the progress of the medical arts.

SUMMARY OF THE INVENTION

I have discovered that the N-4-arylbicyclo[2.2.2]oct-1-yl urethans are useful as antidepressant agents. For the purposes of this description, the term N-4 - arylbicyclo [2.2.2]oct-1-yl urethans includes the following types of compounds:

N-4 - phenylbicyclo[2.2.2]oct-2-en-1-yl urethans, N-4-(substituted-phenyl)bicyclo[2.2.2]oct-2-en-1-yl urethans, N-4 - phenylbicyclo[2.2.2]octane-1-yl urethans and N-4-(substituted-phenyl)bicyclo[2.2.2]octane-1-yl urethans.

The compounds for use according to the method of this invention are represented by the following formulae:

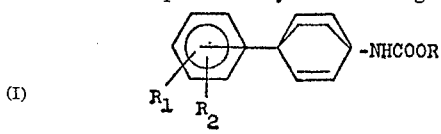

(I)

where R is alkyl of 1 through 8 carbons, ethyl pyrrolidinyl or phenyl; and $R_1$ and $R_2$ are hydrogen, methyl, ethyl, chlorine, bromine, fluorine, nitro, amino, dialkylamino where each alkyl group has 1 through 4 and preferably 1 through 2 carbons, cyano, alkoxy of 1 through 4 and preferably 1 through 2 carbons, alkoxycarbonyl where the alkyl group has 1 through 2 carbons, or trifluoromethyl; and

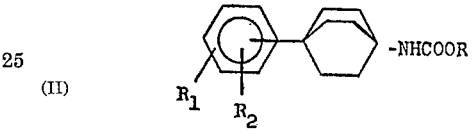

(II)

where R is alkyl of 1 through 8 carbons, ethylpyrrolidinyl or phenyl; and $R_1$ and $R_2$ are hydrogen, methyl, ethyl, chlorine, bromine, fluorine, nitro, amino, dialkylamino where each alkyl group has 1 through 4 and preferably 1 through 2 carbons, cyano, alkoxy of 1 through 4 and preferably 1 through 2 carbons, alkoxycarbonyl where the alkyl group has 1 through 2 carbons, or trifluoromethyl.

Salts of the above compounds with non-toxic anions are included within the scope of this invention where such salt formation is possible. Representative acids from which said anions are derived include hydrochloric acid, sulfuric acid, phosphoric acid, acetic acid, succinic acid, adipic acid, propionic acid, tartaric acid, citric acid and carbonic acid.

Preferred compounds of this invention are those of Formulae I–II in which R is as defined above and $R_1$ is hydrogen, methyl, ethyl, chlorine, bromine, fluorine, nitro, amino, dialkylamino where each alkyl contains from 1 through 2 carbons, alkoxycarbonyl where the alkyl contains from 1 through 2 carbons, and trifluoromethyl.

Particularly preferred of the compounds are those where R is alkyl containing from 1 through 4 carbons and $R_1$ is hydrogen.

Also included within the scope of this invention is the method of producing an antidepressant effect in warm-blooded animals which comprises administering to said warm-blooded animal one or more compounds of Formulae I and II in admixture with other pharmaceutically useful antidepressant compounds.

DESCRIPTION OF THE INVENTION

The compounds of Formulae I and II can be prepared by converting a 4 - arylbicyclo[2.2.2]oct-2-en-1-carboxylic acid to the corresponding 4-arylbicyclo[2.2.2] oct-2-en-1 - yl urethane by a modified Curtius reaction [J. Org. Chem. 26, 3511 (1961)] in which a mixed anhydride of the acid is formed with ethyl chloroformate and then treated with sodium azide to form the acid azide. This is heated in toluene to cause rearrangement to the isocyanate, which is treated with an alcohol to form a urethane of this invention.

The 4 - arylbicyclo[2.2.2]oct - 2 - ene - 1 - carboxylic acid starting materials for the above described reaction can be prepared generally as follows.

A mixture of 6-aryl-α-pyrone-3-carboxylic acid ethyl ester and benzene is mixed with ethylene in a suitable pressure vessel which is then pressured up to 1000 atmospheres at a temperature of under 200° C. The system pressure is increased to up to 3000 atmospheres with ethylene and the elevated temperature is maintained for up to 13 hours. From time to time during this reaction phase, it is necessary to repressure the system with ethylene to maintain the proper pressure.

The pressure vessel is then cooled and the contents discharged, diluted with ethanol and filtered. The alcohol and benzene are distilled off, leaving ethyl 4-arylbicyclo-[2.2.2]oct-2-en-1-carboxylate.

The ethyl 6-aryl-α-pyrone - 3 - carboxylate can be obtained by the method of Kochetkov et al., J. Gen. Chem. USSCSR (English Translation) 28, 1562 (1958).

The ethyl 4-arylbicyclo[2.2.2]oct - 2 - ene - 1 - carboxylate is saponified by heating with aqueous sodium hydroxide until dissolved and then acidifying to precipitate the acid. The acid is filtered off, washed and dried. Alternatively saponification can be effected by heating with sodium hydroxide in diethylene glycol at 160° C. for two hours.

In addition to the above descriptions of the preparation of the compounds of this invention, a better understanding of my invention will be gained by reference to the following examples illustrating the preparation of representative compounds of this invention.

EXAMPLE 1

A solution of 16 ml. (11.6 g., 0.115 mole) of triethylamine in 100 ml. of acetone is added to a stirred mixture of 22.8 g. (0.10 mole) of 4-phenylbicyclo[2.2.2]oct-2-ene-1-carboxylic acid and 300 ml. of acetone. This solution is cooled to −5 to 0° C. and a solution of 12.0 g. (0.11 mole) of ethyl chloroformate in 50 ml. of acetone is added dropwise, with cooling, at a rate such that the temperature does not rise above 0° C. When the addition is complete, stirring is continued for 30 minutes, and then a solution of 9.8 g. (0.15 mole) of sodium azide in 30 ml. of water is added dropwise at −5 to 0° C. After addition is complete, stirring is continued for 1 hour. The cold solution is diluted with ice water and is extracted with toluene. The toluene solution is dried with anhydrous magnesium sulfate, is filtered, and is heated on a steam bath until the evolution of nitrogen is complete. Then, 0.10 mole of methanol and 5 ml. of triethylamine are added and the mixture is heated at reflux for 16 hours. On cooling, the solution yields methyl N-4-phenylbicyclo-[2.2.2]oct-2-en-1-yl urethan, M.P. 141.5–143° C.

EXAMPLES 2–29

Example 1 is repeated, substituting 0.10 mole of the indicated reactant for the 4-phenylbicyclo[2.2.2]oct-2-ene-1-carboxylic acid and the indicated alcohol for methanol.

| Example | Acid | Alcohol | Product |
| --- | --- | --- | --- |
| 2 | 4-phenylbicyclo[2.2.2]-oct-2-ene-1-carboxylic acid | Ethanol | Ethyl N-4-phenylbicyclo-[2.2.2]oct-2-en-1-yl urethan. |
| 3 | do | Benzyl alcohol | Benzyl N-4-phenylbicyclo-[2.2.2]oct-2-en-1-yl urethan. |
| 4 | 4-(p-tolyl)bicyclo[2.2.2]-oct-2-ene-1-carboxylic acid | Ethanol | Ethyl N-4-(p-tolyl)bicyclo-[2.2.2]oct-2-en-1-yl urethan. |
| 5 | 4-(p-ethylphenyl)bicyclo-[2.2.2]oct-2-ene-1-carboxylic acid | do | Ethyl N-4-(p-ethylphenyl)-bicyclo[2.2.2]oct-2-en-1-yl urethan. |
| 6 | 4-(p-fluorophenyl)bicyclo-[2.2.2]oct-2-ene-1-carboxylic | Butanol | Butyl N-4-(p-fluorophenyl)-bicyclo[2.2.2]oct-2-en-1-yl urethan. |
| 7 | 4-(p-chlorophenyl)bicyclo-[2.2.2]oct-2-ene-1-carboxylic acid | Isopropanol | Isopropyl N-4-(p-chlorophenyl)bicyclo[2.2.2]oct-2-en-1-yl urethan. |
| 8 | 4-(p-bromophenyl)bicyclo-[2.2.2]oct-2-ene-1-carboxylic acid | 1-octanol | n-Octyl N-4-(p-bromophenyl)-bicyclo[2.2.2]oct-2-en-1-yl urethan. |
| 9 | 4-(p-cyanophenyl)bicyclo-[2.2.2]oct-2-ene-1-carboxylic acid | Propanol | Propyl N-4-(p-cyanophenyl)-bicyclo[2.2.2]oct-2-en-1-yl urethan. |
| 10 | 4-(p-nitrophenyl)bicyclo-[2.2.2]oct-2-ene-1-carboxylic acid | 2-methoxy ethanol | 2-methoxyethyl N-4-(p-nitrophenyl)bicyclo[2.2.2]-oct-2-en-1-yl urethan. |
| 11 | 4-(p-methoxyphenyl)bicyclo-[2.2.2]oct-2-ene-1-carboxylic acid | Ethanol | Ethyl N-4-(p-methoxyphenyl)-bicyclo[2.2.2]oct-2-en-1-yl urethan. |
| 12 | 4-(p-methoxycarbonylphenyl)-bicyclo[2.2.2]oct-2-ene-1-carboxylic acid | Methanol | Methyl N-4-(p-methoxycarbonylphenyl)bicyclo-[2.2.2]oct-2-en-1-yl urethan. |
| 13 | 4-(p-ethoxycarbonylphenyl)-bicyclo[2.2.2]oct-2-ene-1-carboxylic acid | Ethanol | Ethyl N-4-(p-ethoxycarbonyl-phenyl)bicyclo[2.2.2]-oct-2-en-1-yl urethan. |
| 14 | 4-(m-tolyl)bicyclo[2.2.2]-oct-2-ene-1-carboxylic acid | 2-dimethylamino ethanol | 2-dimethylaminoethyl-N-4-(m-tolyl)bicyclo[2.2.2]-oct-2-en-1-yl urethan. |
| 15 | 4-(m-fluorophenyl)bicyclo-[2.2.2]oct-2-ene-1-carboxylic acid | 2-pyrrolidyl ethanol | 2-pyrrolidylethyl N-4-(m-fluorophenyl)bicyclo-[2.2.2]-oct-2-en-1-yl urethan. |
| 16 | 4-(m-bromophenyl)bicyclo-[2.2.2]oct-2-ene-1-carboxylic acid | Hexanol | Hexyl N-4-(m-bromophenyl)-bicyclo[2.2.2]oct-2-en-1-yl urethan. |
| 17 | 4-(m-methoxyphenyl)bicyclo-[2.2.2]oct-2-ene-1-carboxylic acid | Heptanol | Heptyl N-4-(m-methoxyphenyl)bicyclo[2.2.2]oct-2-en-1-yl urethan. |
| 18 | 4-(m-methoxycarbonyl-phenyl)bicyclo[2.2.2]oct-2-ene-1-carboxylic acid | Propanol | Propyl N-4-(m-methoxycarbonylphenyl)bicyclo-[2.2.2]oct-2-en-1-yl urethan. |
| 19 | 4-(m-ethoxycarbonylphenyl)-bicyclo[2.2.2]oct-2-ene-1-carboxylic acid | 2-butanol | 2-butyl N-4-(m-ethoxycarbonylphenyl)bicyclo-[2.2.2]oct-2-en-1-yl urethan. |
| 20 | 4-(o-tolyl)bicyclo[2.2.2]-oct-2-ene-1-carboxylic acid | Ethanol | Ethyl N-4-(o-tolyl)bicyclo-[2.2.2]oct-2-en-1-yl urethan. |
| 21 | 4-(o-fluorophenyl)bicyclo-[2.2.2]oct-2-ene-1-carboxylic acid | Methanol | Methyl N-4-(o-fluorophenyl)-bicyclo[2.2.2]oct-2-en-1-yl urethan. |
| 22 | 4-(o-chlorophenyl)bicyclo[2.2.2]oct-2-ene-1-carboxylic acid | do | Methyl N-4-(o-chlorophenyl)-bicyclo[2.2.2]oct-2-en-1-yl urethan. |
| 23 | 4-(o-bromophenyl)bicyclo[2.2.2]oct-2-ene-1-carboxylic acid | Propanol | Propyl N-4-(o-bromophenyl)-bicyclo[2.2.2]oct-2-en-1-yl urethan. |
| 24 | 4-(o-nitrophenyl)bicyclo[2.2.2]oct-2-ene-1-carboxylic acid | 2-methoxy ethanol | 2-methoxyethyl N-4-(o-nitrophenyl)bicyclo[2.2.2]-oct-2-en-1-yl urethan. |
| 25 | 4-(2,4-dimethylphenyl)bicyclo[2.2.2]oct-2-ene-1-carboxylic acid | Butanol | Butyl N-4-(2,4-dimethylphenyl)bicyclo[2.2.2]oct-2-en-1-yl urethan. |
| 26 | 4-(3,5-dimethylphenyl)bicyclo[2.2.2]oct-2-ene-1-carboxylic acid | Ethanol | Ethyl N-4-(3,5-dimethylphenyl)bicyclo[2.2.2]oct-2-en-1-yl urethan. |
| 27 | 4-(3,4-dimethoxyphenyl)bicyclo[2.2.2]oct-2-ene-1-carboxylic acid | Methanol | Ethyl N-4-(3,4-dimethoxyphenyl)bicyclo[2.2.2]oct-2-en-1-yl urethan M.P. 123.5-124° C. |
| 28 | 4-(3-bromo-4-methoxyphenyl)-bicyclo[2.2.2]oct-1-carboxylic acid | Hexanol | Hexyl N-4-(3-bromo-4-methoxyphenyl)bicyclo[2.2.2]-oct-2-en-1-yl-urethan. |
| 29 | 4-(3-nitro-4-methoxyphenyl)bicyclo[2.2.2]oct-2-ene-1-carboxylic acid | Methanol | Methyl N-4-(3-nitro-4-methoxyphenyl)bicyclo[2.2.2]-oct-2-en-1-yl urethan. |

EXAMPLE 30

A solution of 40 g. of ethyl 4-phenylbicyclo[2.2.2]oct-2-ene-1-carboxylate in 100 ml. of ethanol is hydrogenated for 16 hours at atmospheric pressure. A solution of 0.2 M chloroplatinic acid initially is added to the solution until uptake of hydrogen commences. The catalyst is filtered off and the solvent is evaporated. The residue is recrystallized from methanol to give 22.2 g. of ethyl 4-phenylbicyclo[2.2.2]octane - 1 - carboxylate, M.P. 68–69° C.

A mixture of 11 g. of ethyl 4 - phenylbicyclo[2.2.2]-octane-1-carboxylate and 1000 ml. of 2 N sodium hydroxide solution is refluxed for 16 hours with stirring. The

EXAMPLES 32–54

By substituting a lower alkyl ester of the desired 4-arylbicyclo[2.2.2]oct-2-ene-1-carboxylic acid for the ethyl 4-phenylbicyclo[2.2.2]oct-2-ene-1-carboxylate in Example 30 and then substituting the resultant arylbicyclo-[2.2.2]octane-1-carboxylic acid for the 4-phenylbicyclo-[2.2.2]octane-1-carboxylic acid in Example 31 and by using the indicated alcohol, the indicated urethans may be prepared.

| Example | Acid | Alcohol | Product |
|---|---|---|---|
| 32 | 4-o-tolylbicyclo[2.2.2]-octane-1-carboxylic acid | Methanol | Methyl N-4-o-tolylbicyclo[2.2.2]octan-1-yl urethan. |
| 33 | 4-m-tolylbicyclo[2.2.2]-octane-1-carboxylic acid | Propanol | Propyl N-4-m-tolylbicyclo[2.2.2]octan-1-yl urethan. |
| 34 | 4-p-tolylbicyclo[2.2.2]-octane-1-carboxylic acid | Octanol | Octyl N-4-p-tolylbicyclo[2.2.2]octan-1-yl urethan. |
| 35 | 4-p-ethylphenylbicyclo-[2.2.2]octane-1-carboxylic acid | 2-propanol | 2-propyl N-4-p-ethylphenylbicyclo[2.2.2]octan-1-yl urethan. |
| 36 | 4-(2,4-dimethyl)phenylbicyclo[2.2.2]octane-1-carboxylic acid | Ethanol | Ethyl N-4-(2,4-dimethyl)bicyclo[2.2.2]octan-1-yl urethan. |
| 37 | 4-(3,5-dimethyl)phenylbicyclo[2.2.2]octane-1-carboxylic acid | Hexanol | Hexyl N-4-(3,5-dimethylphenyl)bicyclo[2.2.2]octan-1-yl urethan. |
| 38 | 4-(2,6-dimethyl)phenylbicyclo[2.2.2]octane-1-carboxylic acid | Propanol | Propyl N-4-(2,6-dimethylphenyl)bicyclo[2.2.2.]octan-1-yl urethan. |
| 39 | 4-(4-ethyl-2-methylphenyl)-bicyclo[2.2.2]octane-1-carboxylic acid | Methanol | Methyl N-4-(4-ethyl-2-methylphenyl)bicyclo[2.2.2]octan-1-yl urethan. |
| 40 | 4-(2,4-diethylphenyl)-bicyclo[2.2.2]octane-1-carboxylic acid | Ethanol | Ethyl N-4-(2,4-diethylphenyl)bicyclo[2.2.2]octan-1-yl urethan. |
| 41 | 4-(p-fluorophenyl)bicyclo[2.2.2]octane-1-carboxylic acid | Pentanol | Pentyl N-4-(p-fluorophenyl)bicyclo[2.2.2]octan-1-yl urethan. |
| 42 | 4-(p-chlorophenyl)bicyclo-[2.2.2]octane-1-carboxylic acid | Butanol | Butyl N-4-(p-chlorophenyl)bicyclo[2.2.2]octan-1-yl urethan. |
| 43 | 4-(p-bromophenyl)bicyclo-[2.2.2]octane-1-carboxylic acid | Heptanol | Heptyl N-4-(p-bromophenyl)bicyclo[2.2.2]octan-1-yl urethan. |
| 44 | 4-(o-chlorophenyl)bicyclo-[2.2.2]octane-1-carboxylic acid | Allyl alcohol | Allyl N-4-(o-chlorophenyl)bicyclo[2.2.2]octan-1-yl urethan. |
| 45 | 4-(o-bromophenyl)bicyclo-[2.2.2]octane-1-carboxylic acid | 2-methoxyethanol | 2-methoxyethyl N-4-(o-bromophenyl)bicyclo[2.2.2]octan-1-yl urethan. |
| 46 | 4-(o-chlorophenyl)bicyclo-[2.2.2]octane-1-carboxylic acid | Methanol | Methyl N-4-(o-chlorophenyl)bicyclo[2.2.2]octan-1-yl urethan. |
| 47 | 4-(p-bromophenyl)bicyclo-[2.2.2]octane-1-carboxylic acid | Ethanol | Ethyl N-4-(p-bromophenyl)bicyclo[2.2.2]octan-1-yl urethan. |
| 48 | 4-(p-methoxyphenyl)bicyclo-[2.2.2]octane-1-carboxylic acid | do | Ethyl N-4-(p-methoxyphenyl)bicyclo[21212]octan-1-yl urethan. M.P. 108.5–109° C. |
| 49 | 4-(p-ethoxyphenyl)bicyclo-[2.2.2]octane-1-carboxylic acid | 2-butanol | 2-butyl N-4-(p-ethoxyphenyl)bicyclo[2.2.2]octan-1-yl urethan. |
| 50 | 4-(2,4-difluorophenyl)-bicyclo[2.2.2]octane-1-carboxylic acid | 2-propanol | 2-propyl N-4-(2,4-difluorophenyl)bicyclo[2.2.2]octan-1-yl urethan. |
| 51 | 4-(2-chloro-4-fluorophenyl)bicyclo[2.2.2]octane-1-carboxylic acid | Butanol | Butyl N-4-(2-chloro-4-fluorophenyl)bicyclo[2.2.2]octan-1-yl urethan. |
| 52 | 4-(2,4-dimethoxyphenyl)-bicyclo[2.2.2]octane-1-carboxylic acid | 2-pyrrolidylethanol | 2-Pyrrolidylethyl N-4-(2,4-dimethoxyphenyl)bicyclo[2.2.2]octan-1-yl urethan. |
| 53 | 4-(3,4-dimethoxyphenyl)-bicyclo[2.2.2]octane-1-carboxylic acid | Ethanol | Ethyl N-4-(3,4-dimethoxyphenyl)bicyclo[2.2.2]octan-1-yl urethan. |
| 54 | 4-(2,4-dinitrophenyl)-bicyclo[2.2.2]octane-1-carboxylic acid | do | Ethyl N-4-(2,4-dinitrophenyl)bicyclo[2.2.2]octan-1-yl urethan. | mixture is allowed to cool slightly and is acidified with concentrated HCl so that the temperature is held at 80–100° C. Cooling the acidified solution gives 9.0 g. of 4 - phenylbicyclo[2.2.2]octan - 1 - carboxylic acid, which can be purified by recrystallization from acetic acid to give crystals, M.P. 277–279° C. A sample purified for analysis melts at 282–284° C.

*Analysis.*—Calcd. for $C_{15}H_{18}O_2$: C, 78.23%; H, 7.88% (mol. wt., 230). Found: C, 77.76%; H, 7.71% (Mol. wt. 226).

EXAMPLE 31

A solution of 16 ml. (11.6 g.) of triethylamine in 100 ml. of acetone is added to a stirred mixture of 23.0 g. of 4-phenylbicyclo[2.2.2]octane-1-carboxylic acid and 300 ml. of acetone. This solution is cooled to −5 to 0° C. and a solution of 12.0 g. of ethyl chloroformate in 50 ml. of acetone is added dropwise, with cooling, at a rate such that the temperature does not rise above 0° C. When the addition is complete, stirring is continued for 30 minutes, and then a solution of 9.8 g. of sodium azide in 30 ml. of water is added dropwise at −5 to 0° C. After addition is complete, stirring is continued for 1 hour. The cold solution is diluted with ice water and is extracted with toluene. The toluene solution is dried with anhydrous magnesium sulfate, is filtered, and is heated on a steam bath until the evolution of nitrogen is complete. Then, 0.10 mole of ethanol and 5 ml. of triethylamine are added and the mixture is heated at reflux for 16 hours. On cooling, the solution yields ethyl N-4-phenylbicyclo[2.2.2]octane-1-yl urethan, M.P. 110–111° C.

EXAMPLE 55

A container of a material resistant to hydrogen fluoride attack (as for example, platinum, "Hastelloy" steel, or polyethylene) is cooled with solid carbon dioxide and acetone and is charged with about 50 ml. of anhydrous hydrogen fluoride. The liquid is stirred and 11.8 g. (0.0432 mole) of ethyl N-4-phenylbicyclo[2.2.2]octan-1-yl urethan is added. Then 2 ml. (3.00 g., 0.043 mole) of fuming nitric acid (90%) is added slowly. The cooling bath is removed and the solution is allowed to stand for 16 hours. The hydrogen fluoride is evaporated, the residue is dissolved in dichloromethane and is washed with 10% sodium carbonate solution. The dichloromethane solution is dried with anhydrous magnesium sulfate and evaporated. The residue is primarily ethyl N-4-(p-nitrophenyl)bicyclo-[2.2.2]octan-1-yl urethan.

EXAMPLE 56

Hydrazine hydrate (20 ml.) is dropped into a suspension of 1 teaspoon of Raney nickel in a solution of 0.040 mole of ethyl N-4-(p-nitrophenyl)bicyclo[2.2.2]oct-2-en-1-yl urethan in 500 ml. of ethanol at 70° C. When the addition is complete, the mixture is cooled and the catalyst is filtered off. The filtrate is evaporated to give ethyl N-4-(p-aminophenyl)bicyclo[2.2.2]oct-2-en-1-yl urethan.

EXAMPLES 57–60

The procedure of Example 56 is repeated substituting 0.040 mole of the indicated reactant for the ethyl N-4-(p-nitrophenyl)bicyclo[2.2.2]oct - 2 - en-1-yl urethan of Example 56.

| Ex. | Reactant | Product |
|---|---|---|
| 57 | Methyl N-4-(m-nitrophenyl)-bicyclo[2.2.2]oct-2-en-1-yl urethan. | Methyl N-4-(m-aminophenyl)-bicyclo[2.2.2]oct-2-en-1-yl urethan. |
| 58 | Butyl N-4-(o-nitrophenyl)-bicyclo[2.2.2]oct-2-en-1-yl urethan. | Butyl N-4-(o-aminophenyl)-bicyclo[2.2.2]oct-2-en-1-yl urethan. |
| 59 | Ethyl N-4-(3-nitro-4-methoxyphenyl)bicyclo[2.2.2]oct-2-en-1-yl urethan. | Ethyl N-4-(3-amino-4-methoxyphenyl)bicyclo[2.2.2]oct-2-en-1-yl urethan. |
| 60 | Ethyl N-4-(p-nitrophenyl)-bicyclo[2.2.2]octan-1-yl urethan. | Ethyl N-4-(p-aminophenyl)-bicyclo[2.2.2]octan-1-yl urethan. |

EXAMPLE 61

A 28.8 g. (0.10 mole) quantity of ethyl N-4-(p-aminophenyl)bicyclo[2.2.2]octan-1-yl urethan is heated with 0.50 mole of formic acid and 0.22 mole of formaldehyde on the steam bath for 2 to 4 hours after evolution of gas has ceased. The reaction mixture is cooled and is diluted with 160 ml. (2 moles) 50% of aqueous sodium hydroxide. The basic solution is extracted with ether, which after drying over sodium sulfate, is evaporated to yield ethyl N-4-(p-dimethylaminophenyl)bicyclo[2.2.2]octan-1-yl urethan.

EXAMPLE 62

A 0.5 g. quantity of 10% Pd on charcoal is added to a solution of 40 g. of methyl N-4-(m-nitrophenyl)bicyclo[2.2.2]oct-2-en-1-yl urethan in 200 ml. of ethanol. The mixture is shaken under 50 lb. per sq. in. of hydrogen for 16 hours. The catalyst is filtered off and the solvent is evaporated. The residue is methyl N-4-(m-aminophenyl)bicyclo[2.2.2]octan-1-yl urethan.

The compounds for use in the method of this invention can be administered for antidepressant effect according to this invention by any suitable means. For example, administration can be parenteral, that is subcutaneous, intravenous, intramuscular, or intraperitoneal. Alternatively or concurrently, administration can be by the oral route.

The dosage administered will be dependent upon age, health and weight of the recipient, the kind of concurrent treatment if any, frequency of treatment, and intensity of the antidepressant response desired. Generally, a daily dosage of active ingredient compound will be from about 0.01 to 10 and preferably 0.05 to 2.5 milligrams per kilogram per day is effective to obtain the desired result.

Ethyl, N-4-phenylbicyclo[2.2.2]oct-2-ene-1-yl urethan, a compound for this invention, strongly indicates antidepressant activity, as is established when said compound, administered orally to mice at a dose of 5.0 mg. per kg. of body weight, successfully demonstrates protection against tetrabenazine-induced sedation.

The active ingredient for this invention can be employed in useful compositions according to the present invention in such dosage forms as tablets, capsules, powder packets, or liquid solutions, suspensions, or elixirs, for oral administration or liquid solutions for parenteral use, and in certain cases, suspensions for parenteral use. In such compositions the active ingredient will ordinarily always be present in an amount of at least 0.01% by weight based on the total weight of the composition and not more than 90% by weight.

Besides the active ingredient of this invention the composition will contain a solid or liquid non-toxic pharmaceutical carrier for the active ingredient.

In one embodiment of a pharmaceutical composition of this invention, the solid carrier is a capsule which can be of the ordinary gelatin type. In the capsule will be from about 1–50% by weight of an N-4-arylbicyclo-[2.2.2]octan- or oct - 2 - en - 1 - yl urethan for this invention and 99–50% of a carrier. In another embodiment, the active ingredient is tableted with or without adjuvants. In yet another embodiment, the active ingredient is put into powder packets and employed. These capsules, tablets, and powders will generally constitute from about 0.5% to about 95% and preferably from 1% to 50% by weight of active ingredient. These dosage forms preferably contain from about 0.5 to about 250 milligrams of active ingredient, with from about 1 milligram to about 50 milligrams most preferred.

The pharmaceutical carrier can, as previously indicated be a sterile liquid such as water and oils, including those of petroleum, animal, vegetable or synthetic origin, for example peanut oil, soybean oil, mineral oil, sesame oil, and the like. In general, water, saline, aqueous dextrose (glucose) and related sugar solutions and glycols such as propylene glycol or polyethylene glycols are preferred liquid carriers, particularly for injectable solutions. Sterile injectable solutions such as saline will ordinarily contain from about 0.05% to 25%, and preferably about 0.1% to 5% by weight of the active ingredient.

As mentioned above, oral administration can be in a suitable suspension or syrup, in which the active ingredient ordinarily will constitute from about 0.01 to 5%, and preferably about 0.02 to 1% by weight. The pharmaceutical carrier in such composition can be a watery vehicle such as an aromatic water, a syrup or a pharmaceutical mucilage.

Suitable pharmaceutical carriers are described in "Remington's Pharmaceutical Sciences" by E. W. Martin, a well-known reference text in this field.

In addition to the exemplary illustrations above, the following examples further explain one aspect of the present invention:

EXAMPLE 63

A large number of unit capsules are prepared for oral administration by filling standard two-piece hard gelatin capsules weighing about 25 milligrams each with 50 milligrams of powdered ethyl, N-4-phenylbicyclo[2.2.2]oct-2-ene-1-yl urethan, 125 milligrams of lactose and 1 milligram of "Cab-o-sil" finely divided silica.

EXAMPLE 64

A large number of unit capsules are prepared for oral administration by filling soft gelatin capsules with a solution of benzyl N-4-phenylbicyclo[2.2.2]oct-2-ene-1-yl urethan in mineral oil.

EXAMPLE 65

A large number of tablets are prepared by conventional procedures so that the dosage unit is 10 milligrams of active ingredient, 5 milligrams of gelatin, 1.5 milligrams of magnesium stearate and 100 milligrams of lactose. Slow release tablets can also be used, by applying appropriate coatings.

A large variety of compositions according to this invention can thus readily be made by substituting other compounds for this invention, and including specifically but not limited to compounds for this invention that have specifically been named hereinbefore. The compounds will be used in the amounts indicated in accordance with procedures well known and described in the Martin text mentioned above.

Since many different embodiments of the invention may be made without departing from the spirit and scope thereof, it is to be understood that the invention is not limited by the specific illustrations except to the extent defined in the following claims.

What is claimed is:

1. A method for producing an antidepressant effect in a warm-blooded animal comprising administering to said animal an antidepressant effective amount of a compound selected from the group consisting of (a)

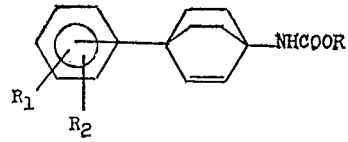

where R is alkyl of 1 through 8 carbons, ethyl pyrrolidinyl or phenyl; and $R_1$ and $R_2$ are hydrogen, methyl, ethyl, chlorine, bromine, fluorine, nitro, amino, dialkylamino where each alkyl group has 1 through 4 and preferably 1 through 2 carbons, cyano, alkoxy of 1 through 4 and preferably 1 through 2 carbons or alkoxycarbonyl where the alkyl group has 1 through 2 carbons, and trifluoromethyl;

(b)

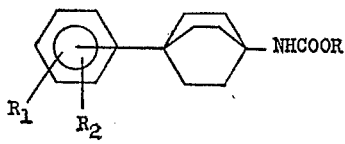

where R is alkyl of 1 through 8 carbons, ethylpyrrolidinyl or phenyl; and $R_1$ and $R_2$ are hydrogen, methyl, ethyl, chlorine, bromine, fluorine, nitro, amino, dialkylamino where each alkyl group has 1 through 4 and preferably 1 through 2 carbons, cyano, alkoxy of 1 through 4 and preferably 1 through 2 carbons or alkoxycarbonyl where the alkyl group has 1 through 2 carbons, and trifluoromethyl; and (c) non-toxic acid addition salts of the compounds of (a) and (b).

2. The method of claim 1 where the compound administered is a compound of the formula:

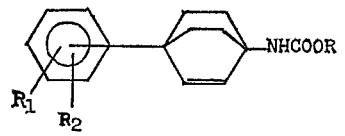

where R is alkyl of 1 through 8 carbons, ethyl pyrrolidinyl or phenyl; and $R_1$ and $R_2$ are hydrogen, methyl, ethyl, chlorine, bromine, fluorine, nitro, amino, dialkylamino where each alkyl group has 1 through 4 and preferably 1 through 2 carbons, cyano, alkoxy of 1 through 4 and preferably 1 through 2 carbons, alkoxycarbonyl where the alkyl group has 1 through 2 carbons and trifluoromethyl.

3. The method of claim 1 wherein the compound administered is a compound of the formula:

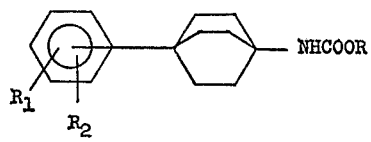

where R is alkyl of 1 through 8 carbons, ethylpyrrolidinyl or phenyl; and $R_1$ and $R_2$ are hydrogen, methyl, ethyl, chlorine, bromine, fluorine, nitro, amino, dialkylamino where each alkyl group has 1 through 4 and preferably 1 through 2 carbons, cyano, alkoxy of 1 through 4 and preferably 1 through 2 carbons, alkoxycarbonyl where the alkyl group has 1 through 2 carbons and trifluoromethyl.

4. A pharmaceutical formulation selected from the group consisting of a tablet, capsule, powder packet, sirup, suspension, elixir and parenteral solution comprising an antidepressant effective amount of a compound selected from the group represented by the formulae:

(a)

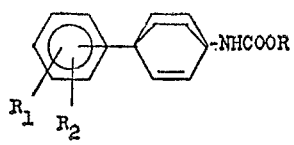

where R is alkyl of 1 through 8 carbons, ethyl pyrrolidinyl or phenyl; and $R_1$ and $R_2$ are hydrogen, methyl, ethyl, chlorine, bromine, fluorine, nitro, amino, dialkylamino where each alkyl group has 1 through 4 and preferably 1 through 2 carbons, cyano, alkoxy of 1 through 4 and preferably 1 through 2 carbons, alkoxycarbonyl where the alkyl group has 1 through 2 carbons and trifluoromethyl;

(b)

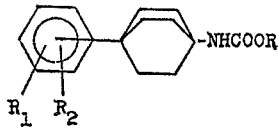

where R is alkyl of 1 through 8 carbons, ethylpyrrolidinyl or phenyl; and $R_1$ and $R_2$ are hydrogen, methyl, ethyl, chlorine, bromine, fluorine, nitro, amino, dialkylamino where each alkyl group has 1 through 4 and preferably 1 through 2 carbons, cyano, alkoxy of 1 through 4 and preferably 1 through 2 carbons, alkoxycarbonyl where the alkyl group has 1 through 2 carbons and trifluoromethyl and (c) a non-toxic acid addition salt of (a) and (b); and and a non-toxic pharmaceutical carrier for said compound.

5. A pharmaceutical formulation of claim 4 wherein the active ingredient is a compound of the formula:

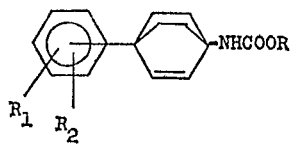

where R is alkyl of 1 through 8 carbons, ethyl pyrrolidinyl or phenyl; and $R_1$ and $R_2$ are hydrogen, methyl, ethyl, chlorine, bromine, fluorine, nitro, amino, dialkylamino where each alkyl group has 1 through 4 and preferably 1 through 2 carbons, cyano, alkoxy of 1 through 4 and preferably 1 through 2 carbons, alkoxycarbonyl where the alkyl group has 1 through 2 carbons and trifluoromethyl.

6. A pharmaceutical formulation of claim 4 wherein the active ingredient is a compound of the formula:

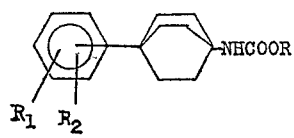

where R is alkyl of 1 through 8 carbons, ethylpyrrolidinyl or phenyl; and $R_1$ and $R_2$ are hydrogen, methyl, ethyl, chlorine, bromine, fluorine, nitro, amino, dialkylamino where each alkyl group has 1 through 4 and preferably 1 through 2 carbons, cyano, alkoxy of 1 through 4 and preferably 1 through 2 carbons, alkoxycarbonyl where the alkyl group has 1 through 2 carbons and trifluoromethyl.

References Cited
UNITED STATES PATENTS 3,337,571  8/1967  Gregory _____ 424—263

STANLEY J. FRIEDMAN, Primary Examiner

U.S. Cl. X.R.

424—300